June 19, 1934.  F. KRATZ  1,963,855
POWER DRIVEN SCREW DRIVER
Filed May 16, 1932
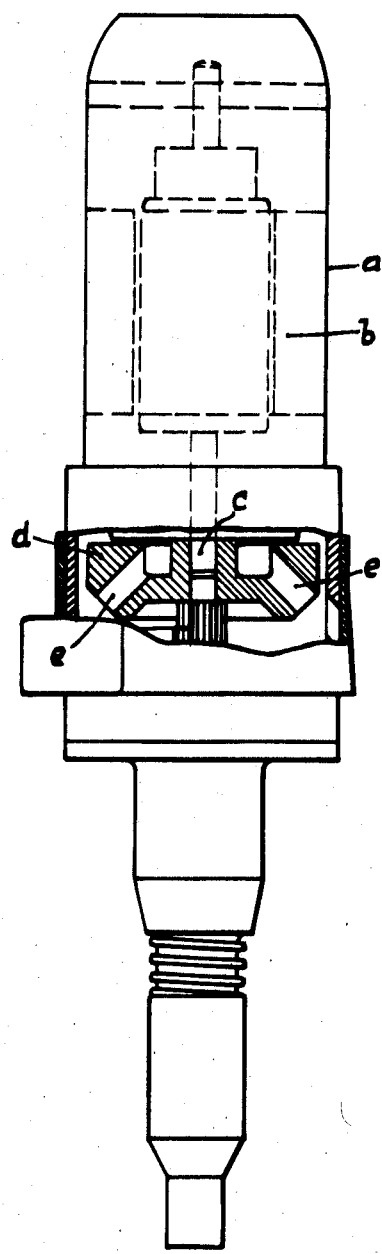

Patented June 19, 1934

1,963,855

UNITED STATES PATENT OFFICE 1,963,855

POWER DRIVEN SCREW-DRIVER

Franz Kratz, Stuttgart, Germany, assignor to Robert Bosch Aktiengesellschaft, Stuttgart, Germany Application May 16, 1932, Serial No. 611,738
In Germany October 19, 1931

2 Claims. (Cl. 144—32)

The present invention relates to power driven hand tools and more particularly to power driven screwdrivers.

In electric screwdrivers the motor when driving in screws has to overcome comparatively great forces at the moment when the heads of the screws bear upon the material and have to be screwed up quite tightly. In the previous constructions, therefore, comparatively large motors were employed, which considerably increased the cost of the tool. Furthermore the dimensions of the tool were so large that special handles had to be provided for their manipulation.

These disadvantages are overcome, according to the invention, by an electric motor of small output and small diameter being employed which can be conveniently arranged in the handle of the tool, and for overcoming the considerable additional loads which occur when finally screwing up or driving home the screws, the motor is provided with a flywheel disc.

An example of construction of the invention is illustrated in the accompanying drawing, which shows a power screwdriver partly in elevation and partly in section.

An electric motor $b$ is arranged in a casing $a$, as indicated in dotted lines in the drawing and has a flywheel disc $d$ secured on its shaft $c$. This disc is constructed so as to act at the same time as a fan disc for cooling the motor, and for this purpose has inclined, outwardly-directed openings $e$.

As will be seen from the drawing, the dimensions of the motor $b$, and thus of the whole casing $a$, are kept so small, that the tool requires no special handle, and owing to its small weight it can be conveniently handled. The additional forces which arise when the screws which are to be driven to bear with their heads up on the material and are to be firmly screwed up, are obtained from the flywheel disc $d$, so that the small capacity of the motor suffices for driving home the screws. The fan disc cools the motor so effectively that it is not injuriously overheated even with continuous work.

By reason of the fact that the combined flywheel and fan is composed of a relatively heavy mass of such weight as to store up sufficient kinetic energy to overcome the additional load required to finally screw up the screws, the motor can be made of such small size and power as to be incapable by itself, without the assistance of the flywheel momentum, of overcoming such additional load, and this is true, notwithstanding the fact that the difference between the normal load and the overload is considerable. This permits the use of a small, light, inexpensive motor which fits within a casing so small that it can be held in the hand of the operator and the resulting assembly is not only inexpensive but exceedingly compact and light in weight and therefore easily handled and operated.

As usual the screw driver blade is connected to the motor axially by an engaging and disengaging coupling for instance a slip-clutch. The flywheel disc when the screw is driven in, assists the disengagement of this slip-clutch.

Various changes in the form, proportion and the minor details of construction may be made without departing from the principle or sacrificing any of the advantages of the invention as defined in the appended claims.

I declare, that what I claim is:

1. In a portable power driven screwdriver, a casing of a size adapted to be held in the hand of an operator, an electric motor arranged in said casing, said motor being of such small size and power as to be incapable by itself of overcoming the overload required to finally screw up the screws after the screw head engages the penetrated material, and a relatively heavy mass connected to and rotating with said motor and of designed form and weight in excess of that prescribed by its mechanical construction adapting said mass to store sufficient kinetic energy to overcome the additional load required to finally screw up the screws.

2. A portable power driven screw driver as set out in claim 1 in which the mass is formed to operate as a fan.

FRANZ KRATZ.